United States Patent [19]

Jones

[11] Patent Number: 4,814,185
[45] Date of Patent: Mar. 21, 1989

[54] APPARATUS FOR REPAIRING BREAKS IN GLASS

[76] Inventor: William A. Jones, 7197½ NW. 16, Bethany, Okla. 73008

[21] Appl. No.: 88,866

[22] Filed: Aug. 24, 1987

[51] Int. Cl.⁴ ............................................. B32B 35/00
[52] U.S. Cl. ..................................... 425/12; 156/94; 264/36; 425/13
[58] Field of Search ............. 156/94; 264/36; 425/12, 425/13

[56] References Cited

U.S. PATENT DOCUMENTS

| | | | |
|---|---|---|---|
| 3,562,366 | 2/1971 | Sohl | 264/36 X |
| 3,765,975 | 10/1973 | Hollingsworth | 156/94 |
| 3,993,520 | 11/1976 | Werner et al. | 156/94 |
| 4,385,879 | 5/1983 | Wilkinson | 264/36 X |
| 4,569,808 | 2/1986 | Smali | 156/94 |
| 4,744,841 | 5/1988 | Thomas | 156/94 X |
| 4,753,695 | 6/1988 | Alexander et al. | 156/94 |
| 4,775,305 | 10/1988 | Alexander et al. | 425/12 |
| 4,776,780 | 10/1988 | Banks | 425/12 |

Primary Examiner—Robert A. Dawson
Attorney, Agent, or Firm—Dunlap, Codding & Peterson

[57] ABSTRACT

A system for repairing breaks in laminated and plate glass utilizing a glass replacement chemical wherein glass replacement chemical is disposed in a dispenser having a dispensing end. The apparatus includes a base and an injector tube supported on the base. A tube opening is formed in a portion of the injector tube with a portion of the tube opening intersecting the lower end of the injector tube and an access opening is formed in a portion of the injector tube with the access opening intersecting an outer peripheral surface of the injector tube and extending a distance through the injector tube and intersecting the tube opening. A seal assembly is supported in the injector tube for sealing the lower end portion of the injector tube to the glass to be repaired with the tube opening being disposed generally over a portion of the break in the glass. An arm assembly is connected to the injector tube for supporting the dispenser so the dispensing end of the dispenser is disposed in the access opening to facilitate the injection of glass replacement chemical into the tube opening. In one embodiment, the apparatus also includes an insert and means for holding the insert in place during the repair process, particularly useful in repairing the plate glass.

21 Claims, 3 Drawing Sheets

APPARATUS FOR REPAIRING BREAKS IN GLASS

FIELD OF THE INVENTION

The present invention generally relates to the repairing of breaks in glass and, more particularly, but not by way of limitation, the present invention generally relates to method and apparatus for repairing breaks in plate or laminated glass including an applicator for applying a glass replacement chemical to the glass generally about the break.

DESCRIPTION OF THE PREFERRED EMBODIMENTS

Figure 1:
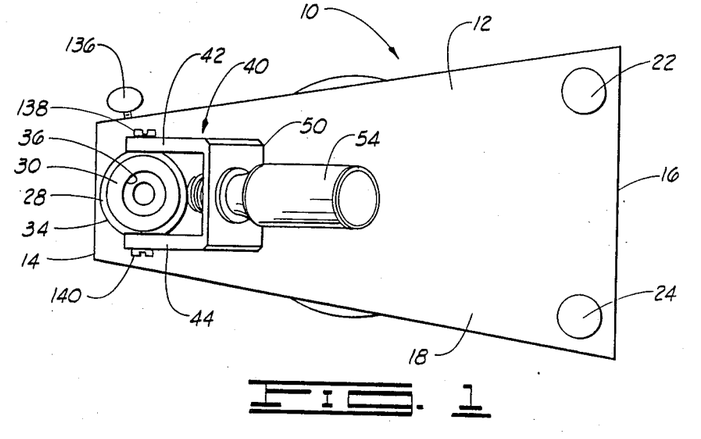
FIG. 1 is a top view of an applicator constructed in accordance with the present invention with a bottle containing glass replacement chemical supported by a portion of the applicator.
Figure 2:
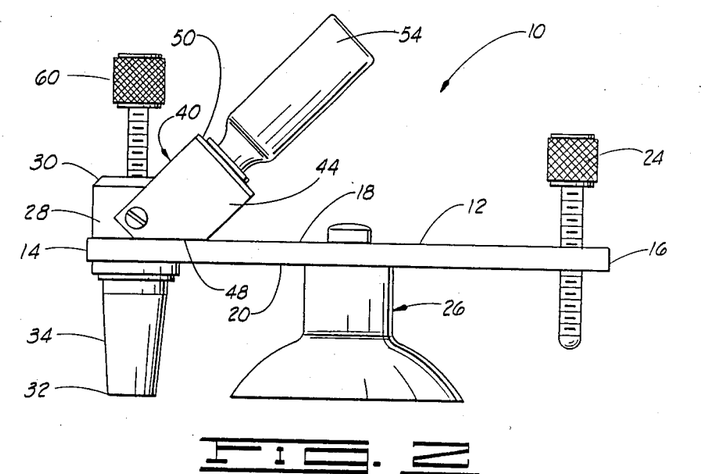
FIG. 2 is a side view of the applicator of FIG. 1.
Figure 3:
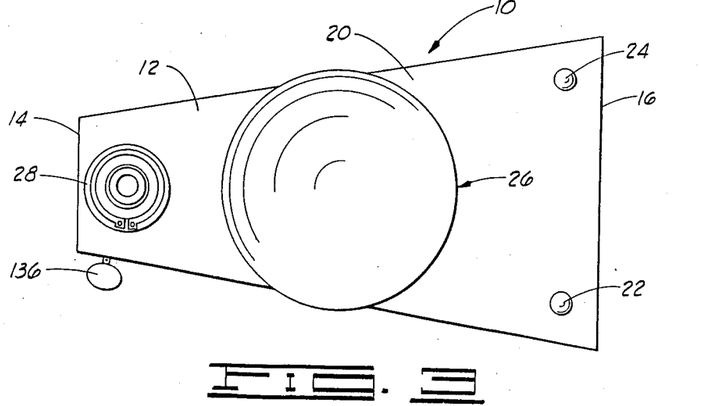
FIG. 3 is a bottom view of the applicator of FIG. 1.

Shown in FIGS. 1, 2 and 3 is an applicator constructed in accordance with the present invention which is used to repair breaks in laminated or plate glass, the applicator being designated by the general reference numeral 10.

The applicator 10 includes a base 12 which generally is triangularly shaped. The base 12 has a forward end 14, a rearward end 16, an upper surface 18 and a lower surface 20.

An adjustment screw 22 is threadedly disposed through an opening generally near the rearward end 16 of the base 12 and generally near one side of the base 12. Another adjustment screw 24 is threadedly disposed through an opening in the base 12 generally near the rearward end 16 of the base 12 and generally near one side of the base 12. Each adjustment screw 22 and 24 is threaded through the base 12 so a portion of each adjustment screw 22 and 24 extends a distance from the lower surface 20 of the base 12.

One end of a section cup 26 is secured to a central portion of the lower surface 20 of the base 12, generally midway between the forward and the rearward ends 14 and 16, and the suction cup 26 extends a distance from the lower surface 20 of the base 12. The suction cup 26 preferably is constructed of a rubber material and is adapted to be removeably securable to glass during portions of the repair process to be described in greater detail below. The suction cup 26, more particularly, is adapted to suctioningly engage the plate or laminated glass during the repair process. Suction cups which are adapted to suctioningly engage glass or other surfaces and which are constructed and operate exactly like that described before with respect to the suction cup 26 are well known in the art and a detailed description of the construction and operation of such a suction cup is not deemed necessary herein.

An injector tube 28 is secured through an opening in the forward end 14 of the base 12. The injector tube 28 includes an upper end 30, a lower end 32 and an outer peripheral surface 34. In the assembled position, the upper end 30 of the injector tube 28 extends a distance above the upper surface 18 of the base 12 and the lower end 32 of the injector tube 28 extends a distance from the lower surface 20 of the base 12 terminating with the lower end 32 thereof. As shown more clearly in FIG. 4, a tube opening 36 is formed through the injector tube 28, the tube opening 36 intersecting the upper end 30 and extending through the injector tube 28 intersecting the lower end 32 of the injector tube 28. A portion of the tube opening 36 is threaded for reasons which will be made more apparent below.

Figure 4:
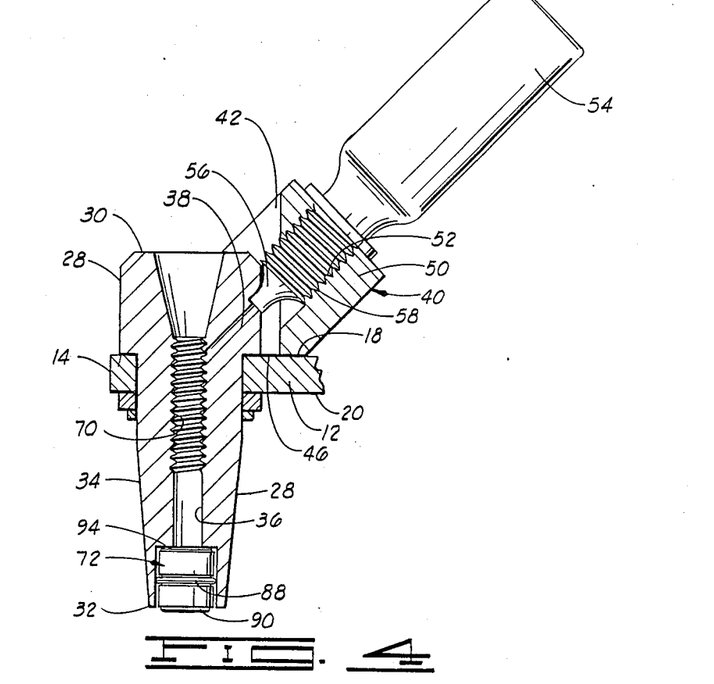
FIG. 4 is a cross section view of a portion of the applicator of FIG. 1 with the bottle containing glass replacement chemical supported thereon.

An access opening 38 is formed through and intersects the outer peripheral surface 34 of the injector tube 28 at a position generally between the upper and the lower ends 30 and 32 of the injector tube 28. The access opening 38 extends angularly through the injector tube 28 intersecting the tube opening 36. The access opening 38 is positioned above the upper surface 18 of the base 12 in an assembled position of the injector tube 28 on the base 12.

An arm assembly 40 is connected to an upper end 30 portion of the injector tube 28. The arm assembly 40 includes two flanges 42 and 44, one end of the flange 42 being connected to one side of the injector tube 28 and one end of the flange 44 being connected to an opposite side of the injector tube 28. The flanges 42 and 44 each extend a distance angularly upwardly from the outer peripheral surface 34 of the injector tube 28 and each of the flanges 42 and 44 include a flat portion 46 and 48, respectively, which is engagable with the upper surface 18 of the base 12 for cooperating to support the flanges 42 and 44 in the angularly and upwardly extending position. A plate 50 is connected to each of the flanges 42 and 44, the plate 50 extending generally between the two flanges 42 and 44. A threaded opening 52 is formed through a central portion of the plate 50. The threaded opening 52 is sized to threadedly receive one end portion of a bottle 54 and the arm assembly 40 cooperates to support the bottle 54 in an angularly upwardley extending position with respect to the axis of the tube opening 36, generally adjacent the access opening 38 in the injector tube 28.

The bottle 54 includes a dispensing end 56 and a portion 58 of the bottle 54 generally near a dispensing end 56 is threaded, the threaded portion 58 being adapted to threadedly engage the threaded opening 52 in the arm assembly 40. In an assembled position, the dispensing end 56 of the bottle 54 is inserted through the threaded opening 52 to a position wherein the threaded portion 58 engages the threaded opening 52 and, in this position, the bottle 54 is threaded secure to the arm assembly 40. When the bottle 54 is secured to the arm assembly 40, the dispensing end 56 of the bottle 54 is disposed through the access opening 38 in the injector tube 28.

The bottle 54 contains a glass replacement chemical and, when the bottle 54 is assembled to the arm assembly 40 with the dispensing end 56 inserted into the access opening 38, the bottle 54 then can be squeezed to dispense the glass replacement chemical through the dispensing end 56 and into the access opening 38. Since the access opening 38 is in communication with the tube opening 36, the glass replacement chemical flows through the access opening 38 and then into the tube opening 36. The bottle 54 preferably is constructed of a flexible, plastic material so that the bottle 54 can be squeezed to dispense the glass replacement chemical through the dispensing end 56 thereof. Bottles of the type just described with respect to the bottle 54 are well known in the art and commercially available.

The glass dispensing chemical contemplated by the present invention is a flowable material which, when cured, fills cracks or breaks in glass and has characteristics similar to that of glass when cured, so the cured glass replacement chemical not only fills the space formed by the crack or break in the glass, but also substantially has the appearance of the adjacent glass structures so that the repaired area is not readily visible.

Figure 6:
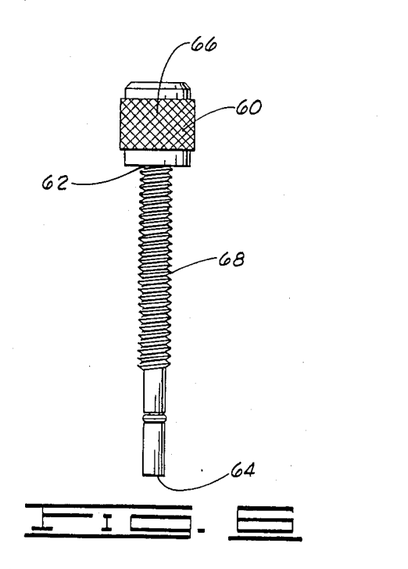
FIG. 6 is a side elevational view of a plunger constructed and adapted to be inserted in one end of an injector tube portion of the applicator of FIG. 1.

As shown more clearly in FIG. 6, the applicator 10 also includes a plunger 60 having an upper end 62 and a lower end 64. A cap 66 is secured to the upper end 62 of the plunger 60. The plunger 60 is generally cylindrically shaped having an outer peripheral surface 68 a portion of which is threaded. As shown more clearly in FIG. 4, a portion 70 of the tube opening 36 is threaded and the threaded portions 70 of the tube opening 36 is sized and adapted to threadedly engage the threaded portion of the outer peripheral surface 68 of the plunger 60, during one aspect of the repair operation, as will be described in greater detail below.

Figure 5:
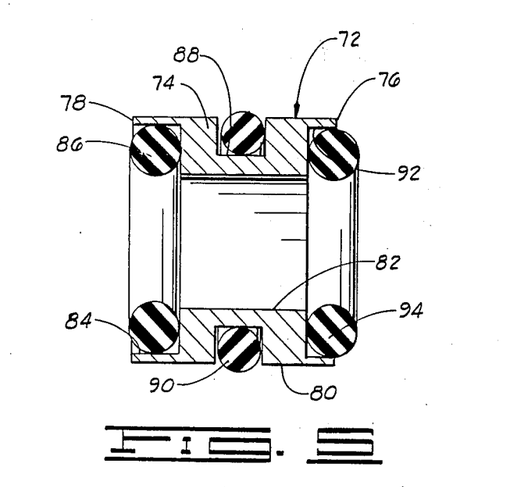
FIG. 5 is a cross section view of a seal assembly which is disposed in an injector tube portion of the applicator of FIG. 1.

As shown more clearly in FIGS. 4 and 5, a seal assembly 72 is inserted into the tube opening 36 and disposed generally near the lower end 32 of the injector tube 38 with a portion of the seal assembly 72 extending a distance beyond the lower end 32 of the injector tube 28 for sealingly engaging the glass to be repaired, during the repair operations. The seal assembly 72 includes a cylindrically shaped housing 74 having an upper end 76, a lower end 78 and an outer peripheral surface 80. An opening 82 is formed through a central portion of the housing 74, and the opening 82 extends through the housing 74 intersecting the upper and the lower ends 76 and 78 thereof. The opening 82 is sized to receive a lower end 64 portion of the plunger 60 during one aspect of the repair operations, as will be described in greater detail below.

A recess 84 is formed in the lower end 78 of the housing 74 and an O-ring seal 86 is disposed in the recess 84. Another recess 88 is formed in the outer peripheral surface 80 of the housing 74 and an O-ring seal 90 is disposed in the recess 88 with a portion of the O-ring seal 90 extending outwardly from the outer peripheral surface 80. The recess 88 and the O-ring seal 90 disposed in the recess 88 each are positioned about midway between the upper and the lower ends 76 and 78 of the housing 74. Another recess 92 is formed in the upper end 76 of the housing 74 and an O-ring seal 94 is disposed in the recess 92. The O-ring 90 is positioned and sized to sealingly engage the outer peripheral surface 80 of the housing 74 and an adjacent portion of the surface formed in the injector tube 28 by the tube opening 36. The O-ring seal 86 is sized and positioned to extend a distance from the lower end 78 of the housing 74 for sealingly engaging portions of the glass being repaired during the repair process. The O-ring seal 92 sealingly engages the housing 74 and adjacent portions of the plunger 60 during one aspect of the repair process.

Figure 7:
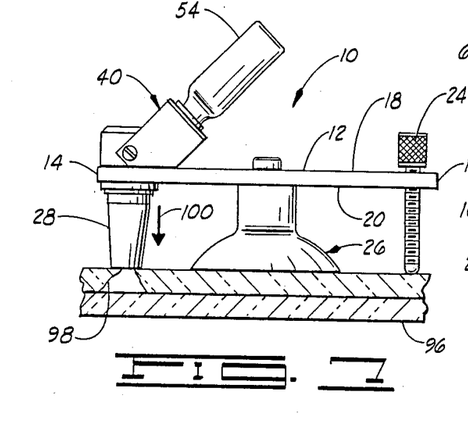
FIG. 7 is a diagrammatic view of the applicator of FIG. 1 centered over a break in laminated glass with a bottle of the glass replacement being supported on the portion of the applicator.
Figure 8:
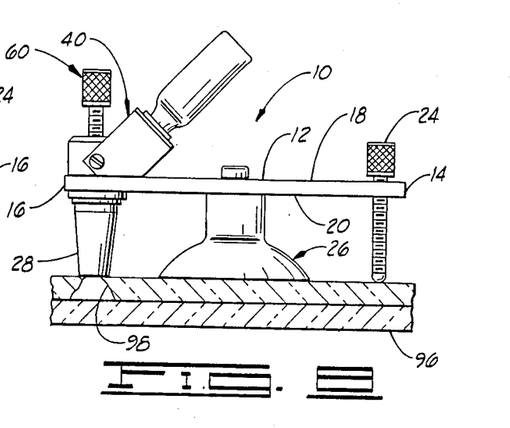
FIG. 8 is a diagrammatic view of the applicator of FIG. 1 centered over the break in the laminated glass and showing the plunger of FIG. 6 partially inserted through the upper end of the injector tube portion of the applicator.
Figure 9:
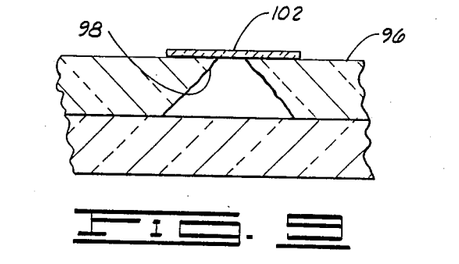
FIG. 9 is a cross section view of the laminated glass of FIGS. 7 and 8 shown with a piece of cellophane positioned over a portion of the break during one stage of the repair process.

In operation, when repairing breaks in laminated glass, the operator first cleans the glass and, then, the operator positions the applicator 10 generally on one surface of the laminated glass where the break appears, as generally shown in FIG. 7, the laminated glass being designated in FIGS. 7, 8 and 9 by the general reference numeral 96 and the break in the laminated glass 96 being designated in FIGS. 7, 8 and 9 by the general reference numerals 98. The lower end 32 of the injector tube 28 is positioned generally over the center portion of the break 98 and the base 12 is depressed or pushed inwardly toward the laminated glass 96, thereby causing the section cup 26 to suctioningly engage the laminated glass 98, thereby securing the applicator 10 to one side of the laminated glass 96. In this position, the tube opening 36 is positioned generally over a central portion of the brake 98 and the O-ring seal 86 is disposed generally adjacent the laminated glass 96.

The operator then threads each of the adjustment screws 22 and 24 further into the base 12 so that one end of each of the adjustment screws 22 and 24 engages a portion of the laminated glass 96. The adjustment screws 22 and 24 further are threaded through the openings of the base 12 thereby pivoting the base 12 generally about the suction cup 26 and forcing the forward end 14 of the base 12 to be moved in a generally downwardly direction 100 (shown in FIG. 7). The movement of the forward end 14 of the base 12 in the downward direction 100 causes the O-ring seal 86 to be pressed into tight engagement with the surface of the laminated glass 96 generally about the break 98 thereby forming a seal between the surface of the laminated glass 96 and the lower end 32 of the injector tube 28 generally about the break 98.

After the injector tube 28 has been sealed to the glass 96, the bottle 54 is threadedly secured to the arm assembly 40 with the dispensing end 56 disposed in the access opening 38. Then, the lower end 64 of the plunger 60 is disposed through the upper end 30 of the injector tube 28 into the tube opening 36. The plunger 60 is rotated about one-half turn to initially engage the threaded portion 70 of the injector tube 28 with the threaded portion of the plunger 60. At this stage of the repair process, the plunger 60 acts to prevent the glass replacement chemical from back flushing out of the tube opening 36, so it only is necessary that the plunger 60 be positioned to close the tube opening 36 generally adjacent the upper end 30 of the injector tube 28 and the plunger 60 should not be inserted into the tube opening 36 beyond the access opening 38 or otherwise interfere with the flow of the glass replacement chemical into the tube opening 36.

After the plunger 60 has been connected to the injector tube 28, the operator then depresses the bottle 54 to cause glass replacement chemical to be dipsensed out of the dispensing end 56 of the bottle 54, into the access opening 38 and into the tube opening 36. The plunger 60 then is threadedly inserted further into the tube opening 36 and through the opening 82 in the housing 74 to force the glass replacement chemical out from the tube opening 36 and into the break 98 in the glass 96. The seal assembly 72 forms the seal with the glass 96. The O-ring seal 90 sealingly engages the injector to be 28 and the outer peripheral surface 80 of the housing 74, and the O-ring seal 90 sealingly engages the housing 74 and the outer peripheral surface 68 of the plunger 60. The seal assembly 72 cooperates to provide a vaccum generally above the break 98 and this vaccum cooperates in pulling the air out of the break 98 so no air bubles remain in the repaired area before and after curing of the glass replacement chemical.

After the glass replacement chemical has been forced into the break 98, the applicator 10 is removed from the glass 96. Then, a small piece of cellophane 102 preferably is placed over the break 98 which is filled with the glass replacement chemical. The glass replacement chemical then is cured. The particular glass replacement chemical specifically identifed before is cured by exposing the glass replacement chemical to ultraviolet light, either natural sunlight or an ultraviolet lamp. After curing the glass replacement chemical, the piece of cellophane is removed, and excess cured glass replacement chemical and any remaining cellophane are scraped from the repaired break 98 area.

The foregoing discussion primarily has been directed to the repair of laminated glass wherein the break extends only through or a distance through one of the laminated plates of glass. The present invention also is directed to the repair of breaks in plate glass. Plate glass comprises a single plate of glass and small breaks in such plate glass in many instances are larger as compared to the breaks in laminated glass and, in many instances, the break extends completely through the plate glass.

Figure 10:
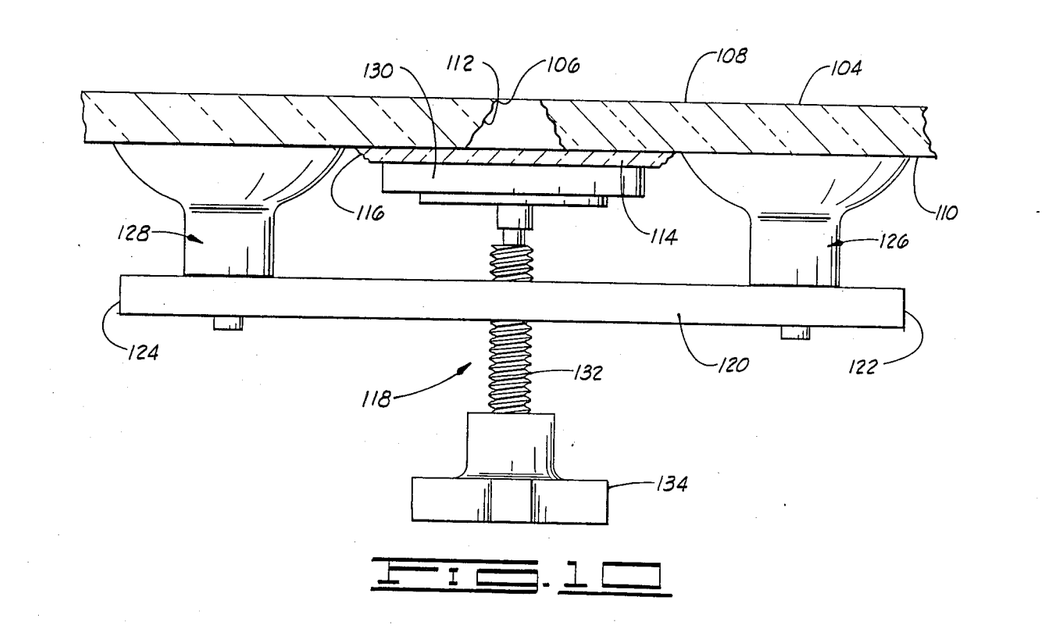
FIG. 10 is a sectional view of plate glass having a break therein and a sectional view of a holder assembly positioned on the plate glass during one stage of the process of repairing plate glass in accordance with the present invention.

Shown in FIG. 10 is a cross section of a portion of plate glass 104 with a break 106 which was initiated on a side 108 of the plate glass 104 and which extends through the plate glass 104 exiting on the other side 110 of the plate glass 104. As diagrammatically illustrated in FIG. 10, a rather large cavity 112 is formed in the plate glass 104 by the break 106 leaving a significant open space in the plate glass 104. A cavity such as the cavity 112 is not formed by a small break in laminated glass as illustrated in FIGS. 7, 8 and 9 with respect to the laminated glass 96 and the break 106, since the laminated glass 96 specifically is designed to prevent such a shattering effect, particularly when the laminated glass is used as windshields in vehicles.

The applicator 10 alone cannot be used effectively to repair the plate glass 104 since the glass replacement chemical simply would flow through the break 106. Thus, when utilizing the present invention to repair the plate glass 104, a circularly shaped glass insert 114 is disposed on the side 110 of the plate glass 104. The glass insert 114 is positioned on the side 110 and sized such that the glass insert 114 extends completely over and closes the cavity 112. It should be noted that an outer peripheral surface 116 of the glass insert 114 is tapered to reduce sharp edges present in the repaired glass.

To install the glass insert 114, both sides 108 and 110 of the plate glass 104, generally about the break 106, are cleaned. Then, a bead of the glass replacement chemical is extended over the side 110 and generally about the cavity 112. The glass insert 114 is positioned over the cavity 112 in the manner described before. A holder assembly 118 then is removably secured to the side 110 of the plate glass 104 and a portion of the holder assembly 118 extends generally over the glass insert 114. The holder assembly 118 includes a portion which is engagable with the glass insert 114 to hold the glass insert 114 in position during the curing of the glass replacement chemical in the manner described before. After the glass replacement chemical is cured, the glass insert 114 is permanently bonded to the side 110 of the plate glass 104.

After bonding the glass insert 114 to the plate glass 104, the holder assembly 118 is removed from the plate glass 104. Then, the applicator 10 is disposed on the side 108 of the plate glass 104 with the lower end 32 of the injector tube 28 being disposed generally over the break 106. The lower end 32 of the injector tube 28 is sealed to the plate glass 104 and the glass replacement chemical is inserted into the break 106 in the same manner as described before with respect to the repair of the laminated glass 96. The glass replacement chemical fills the break 106 including the cavity 112 and the glass insert 114 hold the glass replacement chemical generally within the cavity 112 and prevents the glass replacement chemically from simply running through the break 106. After the glass replacment chemical has been injected into the break 106, the applicator 10 is removed, a piece of cellophane is placed on the side 108 generally over the break 106 and the glass replacement chemical is cured in the same manner as described before with respect to the laminated glass 96.

The same glass replacement chemical can be utilized to effect the repair of breaks in plate glass and laminated glass. However, primarily because of the increased size of the space to be occupied when repairing plate glass as opposed to laminated glass, it has been found that it is desirable to increase the viscosity of the glass replacement. In one embodiment, the glass replacement chemical had a viscosity of about 10 centipoise when used to repair laminated glass and the viscosity of the glass replacement chemical was 40 centipoise when utilized to repair plate glass.

After the break 106 in the plate glass 114 is repaired in the manner described before, the glass insert 114 remains bonded to the plate glass 114. This is the reason the outer peripheral surface 116 is tapered to reduce the presence of sharp edges remaining in the repaired plate glass 104. A piece of material can be inserted between the glass insert 114 and the plate glass 104 which is not reactive with the glass replacement chemical to permit the glass insert 114 to be removed after the repair process. In one other form, the glass insert 114 could be constructed of a different material which is not reactive with the glass replacement chemical so a bond is not formed between the glass replacement chemical and the glass insert 114 so the insert is removable after the repair process.

The holder assembly 118 comprises a bar 120 having opposite ends 122 and 124. One end of a first sucion cup 126 is secured to the bar 120, generally near the end 122, and the first suction cup 126 extends a distance from the bar 120. One end of a second suction cup 128 is secured to the bar 120, generally near the end 124, and the second suction cup 128 extends a distance from the bar 120. The suction cups 126 and 128 each are constructed and operates exactly like that described before with respect to the suction cup 26 to suctioningly engage the plate glass 104 for removably securing the holder assembly 118 to the plate glass 104.

A pad 130 is secured to one end of a threaded rod 132 and the threaded rod 132 is threadedly disposed through a threaded opening formed through the bar 120, generally midway between the opposite ends 122 and 124. A knob 134 is secured to the end of the threaded rod 132, opposite the end having the pad 130 secured thereto.

In operation, the suction cups 126 and 128 cooperate to removably secure the holder assembly 118 to the side 110 of the plate glass 104 with the pad 130 positioned generally above the glass insert 114. The knob 134 then is rotated thereby turning the threaded rod 132 and moving the threaded rod 132 generally toward the glass insert 114. The knob 134 is rotated until the threaded rod 132 has been moved to a position wherein the pad 130 engages the glass insert 114 for holding the glass insert 114 in position until the glass insert 114 is bonded to the plate glass 114, in the manner and for reasons described before.

The O-ring seals 86, 90 and 94 are constructed of a material which is not reactive with the glass replacement chemical.

It has been found that the O-ring seals 86 and 90 are necessary to the proper functioning of the seal assembly 72. In a preferred form, the seal assembly 72 also includes the third O-ring seal 94. The utilization of the seal assembly 72 provides a more uniform seal against the glass thereby reducing leakage.

It is significant to note that the tube opening extends at an angle, generally perpendicular, to the upper surface 18 of the base 12 and the bottle 54 is supported by the holder assembly so the bottle 54 extends angularly upwardly from the upper surface 18 of the base 12. Plate glass and, in many instances, laminated glass is about vertically disposed and it is necessary to repair the glass in this vertically or about vertically disposed condition, the glass being shown in the drawings as being horizontally disposed merely for convenience in illustrating the present invention. Thus, when repairing such vertically disposed glass, the bottle 54 extends angularly upwardly thereby facilitating the dispensing of the glass replacement chemical into the tube opening 36.

The adjustment screws 20 and 24 preferably are constructed of nylon to prevent damage to the glass during the repair process.

In one form, the injector tube 28 is disposed through the opening in the base 12 and the injector tube 28 is rotatable within this opening for positioning the arm assembly 40 is a desired position. A key 136 is threadedly disposed through a side of the base 12 to a position wherein one end of the key 136 engages the injector tube 28 for securing the injector tube 28 in position.

The flanges 42 and 44, more particularly, are secured to the injector tube 28 by way of screws 138 and 140 (shown in FIG. 1). Thus the arm assembly 40 is rotatable about the connection provided by the screws 138 and 140 for selectively positioning the arm assembly 40. This selective positioning of the arm assembly 40 is limited by the engagement of the flat portions 46 and 48 with the upper surface 18 of the base 12 to assure the angular disposition of the bottle 54.

Changes may be made in the construction and operation of the various parts, elements and assemblies described herein and changes may be made in the steps or in the sequence of steps of the methods described herein without departing from the spirit and scope of the invention defined in the following claims.

What is claimed is:

1. Apparatus for repairing breaks in laminated glass utilizing a glass replacement chemical wherein glass replacement chemical is disposed in a dispenser having a dispensing end, the apparatus comprising:

a base having a forward end, a rearward end, an upper surface and a lower surface;

an injector tube having an outer peripheral surface, an upper end and a lower end, the injector tube being supported on the base with a portion of the injector tube extending a distance from the lower surface of the base and terminating with the lower end of the injector tube, a tube opening being formed in a position of the injector tube with a portion of the tube opening intersecting the lower end of the injector tube, an access opening being formed in a portion of the injector tube with the access opening intersecting the outer peripheral surface of the injector tube at a position generally between the upper and the lower ends of the injector tube and the access opening extending a distance through the injector tube and intersecting the tube opening, the tube opening extending generally about perpendicular to the upper surface of the base;

means for sealing the lower end portion of the injector tube to the laminated glass to be repaired in an operating position with the tube opening being disposed generally over a portion of the break to be repaired; and means for supporting the dispenser so the dispensing end of the dispenser is disposed in the access opening and so the dispenser is disposed and supported in an angle with respect to the tube opening, said means supporting the dispenser so the dispenser extends at an angle in a generally upward direction from the upper surface of the base to facilitate the dispensing of the glass replacement chemical into the tube opening even when the laminated glass is disposed in about a vertical plane; said means comprising:

an arm assembly having one end connected to the injector tube and the arm assembly extending a distance from angularly upwardly from the outer peripheral surface of the injector tube, a portion of the arm assembly being adapted to removably receive a portion of the dispenser for supporting the dispenser so that the dispensing end of the dispenser is inserted generally within the access opening in the injector tube, comprising:

a pair of flanges, one end of one of the flanges being connected to the outer peripheral surface of the injector tube and extending a distance angularly upwardly from the outer peripheral surface of the injector tube and one end of the other flange being connected to the outer peripheral surface of the injector tube and disposed generally opposite the first-mentioned flange, said second-mentioned flange extending a distance angularly upwardly from the outer peripheral surface of the injector tube; and a plate connected to each of the flanges and extending generally between the flanges, a threaded opening being formed through a central portion of the plate sized and adapted to receive a portion of the dispenser for supporting the dispenser in a position wherein the dispensing end of the dispenser is disposed generally within the access opening in the injector tube.

2. The apparatus of claim 1 wherein the tube opening in the injector tube is defined further as extending through the injector tube intersecting the upper and the lower ends of the injector tube, and wherein the apparatus is defined further to include:
   a plunger having an upper end and a lower end, the plunger being removably insertable through the upper end of the injector tube and through the tube opening for forcing glass replacement chemical in the tube opening generally outwardly through the lower end of the injector tube.

3. The apparatus of claim 2 wherein a portion of the injector tube formed by the tube opening is threaded, and wherein a portion of the outer peripheral surface of the plunger is threaded, the threaded portion of the plunger being threadedly engagable with the threaded portion in the tube opening for threadedly moving the plunger through the tube opening to force the glass replacement chemical out of the tube opening.

4. The apparatus of claim 1 wherein the means for sealing the lower end portion of the injector tube to the laminated glass is defined further to include a seal assembly comprising:
   a housing having an upper end, a lower end, an outer peripheral surface and an opening extending through the housing intersecting the upper and the lower ends of the housing, the housing being insertable into the tube opening through the lower end of the injector tube to dispose the housing within the injector tube;
   a seal member connected to the housing and disposed generally adjacent the lower end of the housing, the housing being positioned within the tube opening so that the seal member disposed near the lower end of the housing extends a distance from the lower end of the injector tube when the housing is inserted into the tube opening in the injector tube, the seal member being positioned for sealingly engaging the laminated glass during the repair of the laminated glass;
   a seal member connected to the housing and a spaced a distance from the lower end of the housing, the seal member sealingly engaging the outer peripheral surface of the housing and adjacent portions of the injector tube when the housing is disposed in the tube opening in the injector tube.

5. The pparatus of claim 1 wherein the means for sealing the lower end portion of the injector tube to the laminated glass is defined further to include a seal assembly comprising:
   a housing having an upper end, a lower end, an outer peripheral surface and an opening extending through the housing intersecting the upper and the lower ends of the housing, the housing being insertable into the tube opening through the lower end of the injector tube to dispose the housing within the injector tube;
   a seal member connected to the housing and disposed generally adjacent the lower end of the housing, the housing being positioned within the tube opening so that the seal member disposed near the lower end of the housing extends a distance from the lower end of the injector tube when the housing is inserted into the tube opening in the injector tube, the seal member being positioned for sealingly engaging the laminated glass during the repair of the laminated glass;
   a seal member connected to the housing and disposed generally between the upper and the lower ends of the housing, the seal member sealingly engaging the outer peripheral surface of the housing and adjacent portions of the injector tube when the housing is disposed in the tube opening in the injector tube; and
   a seal member connected to the housing generally near the upper end of the housing, the seal member being adapted to sealingly engaging the housing and being sealingly engageable with adjacent portions of the plunger.

6. The apparatus of claim 5 wherein each of the flanges is defined further to include a flat portion engagable with the upper surface of the base for cooperating to support the arm assembly in the angularly upwardly extending position with respect to the plane disposition of the upper surface of the base.

7. The apparatus of claim 1 defined further to include:
   a suction cup having one end connected to the base generally between the forward and rearward ends of the base, the suction cup being adapted to suctioningly engage the glass to be repaired for removably securing the base to the glass.

8. The apparatus of claim 1 defined further to include:
   adjustment screw means movably connected to the base generally near the rearward end of the base having a portion engagable with the glass to be repaired for pivotingly moving the forward end of the base in a downward direction thereby moving the lower end of the injector tube in the downward direction to effect the sealing engagment between the glass and the means for sealing the lower end portion of the injector tube to the glass.

9. Apparatus for repairing breaks in laminated glass utilizing a glass replacement chemical wherein the glass replacement chemical is disposed in a dispenser having a dispensing end and wherein said apparatus is adapted to repair breaks in plate glass using the glass replacement chemical, said apparatus comprising:
   a base having a forward end, a rearward end, an upper surface and a lower surface
   an injector tube having an outer peripheral surface, an upper end and a lower end, the injector tube being supported on the base with a portion of the injector tube extending a distance from the lower surface of the base and terminating with the lower end of the injector tube, a tube opening being formed in a portion of the injector tube with a portion of the tube opening intersecting the lower end of the injector tube, and an access opening being formed in a portion of the injector tube with the access opening intersecting the outer perpheral surface of the injector tube at a position generally between the upper and the lower ends of the injector tube and the access opening extending a distance through the injector tube and intersecting the tube opening;
   means for sealing the lower end portion of the injector tube to the laminated glass to be repaired in an operating position with the tube opening being disposed generally over a portion of the break to be repaired;
   means for supporting the dispenser so the dispensing end of the dispenser is disposed in the access opening and so the dispenser is disposed and supported in an angle with respect to the tube opening;

an insert disposable generally over the break in the plate glass and bondable to the glass for closing any opening in the glass formed by the break; and a holder assembly removably connectable to the glass to be repaired and having a portion engagable with the glass insert for holding the glass insert in position against the glass to be repaired during the repair process.

10. The apparatus of claim 9 wherein the holder assembly is defined further to include:

a bar having opposite ends;

a first suction cup having one end connected to the bar generally near one end of the bar;

a second suction cup having one end connected to the bar generally near the end of the bar opposite the end having the first suction cup connected thereto, the first and the second suction cups each being adapted to suctioningly engage the glass for removably securing the holder assembly to the glass;

a rod having opposite ends and being disposed through a portion of the bar generally between the opposite ends of the bar; and a pad connected to one end of the rod for engaging the insert and cooperating to hold the insert in position against the glass during the repair of the plate glass.

11. An apparatus for repairing breaks in a glass utilizing a glass replacement chemical wherein the glass replacement chemical is in a dispenser having a dispensing end, the apparatus comprising:

a base having a forward end, a rearward end, an upper surface and a lower surface;

an injector tube having an outer peripheral surface, an upper end and a lower end, the injector tube being supported on the base with a portion of the injector tube extending a distance from the lower surface of the base and terminating with the lower end of the injector tube, a tube opening being formed in a portion in the injector tube intersecting the upper and the lower ends of the injector tube, an access opening being formed on a portion of the injector tube with the access opening intersecting the outer peripheral surface of the injector tube at a position generally between the upper and the lower ends of the injector tube and the access opening extending a distance through the injector tube and intersecting the tube opening; and a seal assembly, comprising:

a housing having an upper end, a lower end, an outer peripheral surface and an opening extending therethrough intersecting the upper and the lower ends thereof, the housing being insertable into the tube opening through the lower end of the injector tube;

a seal member connected to the housing and disposed generally near the lower end of the housing, the seal member extending a distance from the lower end of the injector tube when the housing is inserted into the injector tube and the seal member sealingly engaging the outer peripheral surface of the housing, adjacent portions of the injector tube and the glass to be repaired; and a seal member connected to the housing and disposed generally between the upper and the lower ends of the housing said seal member sealingly engaging a portion of the housing and adjacent portions of the injector tube when the housing is inserted in the tube opening in the injector tube.

12. The apparatus of claim 11 defined further to include:

a plunger having an upper end and a lower end, the plunger being removably insertable through the upper end of the injector tube and through the tube opening for forcing glass replacement chemical in the tube opening generally outwardly through the lower end of the injector tube.

13. The apparatus of claim 12 wherein the seal assembly is defined further to include:

a seal member connected to the housing generally near the upper end of the housing, the seal member sealingly engaging the housing and being sealingly engageable with adjacent portions of the plunger.

14. The apparatus of claim 12 wherein a portion of the injector tube formed by the tube opening is threaded, and wherein a portion of the outer peripheral surface of the plunger is threaded, the threaded portion of the plunger being threadedly engagable with the threaded portion in the tube opening for threadedly moving the plunger through the tube opening to force the glass replacement chemical out of the tube opening.

15. The apparatus of claim 11 defined further to include:

a suction cup having one end connected to the base generally between the forward and rearward ends of the base, the suction cup being adapted to suctioningly engage the glass to be repaired for removably securing the base to the glass.

16. The apparatus of claim 11 defined further to include:

adjustment screw means movably connected to the base generally near the rearward end of the base having a portion engagable with the glass to be repaired for pivotingly moving the forward end of the base in a downward direction thereby moving the lower end of the injector tube in the downward direction to effect the sealing engagment between the glass and the means for sealing the lower end portion of the injector tube to the glass.

17. An apparatus for repairing breaks in glass utilizing a glass replacement chemical wherein the glass replacement chemical is disposed in a dispenser having a dispensing end, the apparatus comprising:

a base having a forward end, a rearward end, an upper surface and a lower surface;

an injector tube having an outer peripheral surface, an upper end and a lower end, the injector tube being supported on the base with a portion of the injector tube extending a distance from the lower surface of the base and terminating with the lower end of the injector tube, a tube opening being formed in a portion of the injector tube intersecting the upper and the lower ends of the injector tube, an access opening being formed on a portion of the injector tube with the access opening intersecting the outer peripheral surface of the injector tube at a position generally between the upper and the lower ends of the injector tube and the access opening extending a distance through the injector tube and intersecting the tube opening;

a seal assembly comprising;

a housing having an upper end, a lower end, an outer peripheral surface and an opening extending therethrough intersecting the upper and the lower ends thereof, the housing being insertable into the tube opening through the lower end of the injector tube;

a seal member connected to the housing and disposed generally near the lower end of the housing, the seal member extending a distance from the lower end of the injector tube when the housing is inserted into the injector tube and the seal member sealingly engaging the outer peripheral surface of the housing, adjacent portions of the injector tube and the glass to be repaired; and a seal member connected to the housing and disposed generally between the upper and the lower ends of the housing said seal member sealing engaging a portion of the housing and adjacent portions of the injector tube when the housing is inserted in the tube opening in the injector tube; and an arm assembly having one end connected to the injector tube and the arm assembly extending a distance from angularly upwardly from the outer peripheral surface of the injector tube, a portion of the arm assembly being adapted to removably receive a portion of the dispenser for supporting the dispenser so that the dispensing end of the dispenser is inserted generally within the access opening in the injector tube;

a pair of flanges, one end of one of the flanges being connected to the outer peripheral surface of the injector tube and extending a distance angularly upwardly from the outer peripheral surface of the injector tube and one end of the other flange being connected to the outer peripheral surface of the injector tube and disposed generally opposite the first-mentioned flange, said second-mentioned flange extending a distance angularly upwardly from the outer peripheral surface of the injector tube; and a plate connected to each of the flanges and extending generally between the flanges, a threaded opening being formed through a central portion of the plate sized and adapted to receive a portion of the dispenser for supporting the dispenser in a position wherein the dispensing end of the dispenser is disposed generally within the access opening in the injector tube.

18. An apparatus for repairing breaks in a glass utilizing a glass replacement chemical wherein the glass replacement chemical is in a dispenser having a dispensing end, said apparatus being adapted to repair breaks in plate glass using the glass replacement chemical, said apparatus comprising:

a base having a forward end, a rearward end, an upper surface and a lower surface an injector tube having an outer peripheral surface, an upper end and a lower end, the injector tube being supported on the base with a portion of the injector tube extending a distance from the lower surface of the base and terminating with the lower end of the injector tube, a tube opening being formed in a portion of the injector tube intersecting the upper and the lower ends of the injector tube, an access opening being formed on a portion of the injector tube with the access opening intersecting the outer peripheral surface of the injector tube at a position generally between the upper and the lower ends of the injector tube and the access opening extending a distance through the injector tube and intersecting the tube opening; p1 a seal assembly comprising;

a housing having an upper end, a lower end, an outer peripheral surface and an opening extending therethrough intersecting the upper and the lower ends thereof, the housing being insertable into the tube opening through the lower end of the injector tube;

a seal member connected to the housing and disposed generally near the lower end of the housing, the seal member extending a distance from the lower end of the injector tube when the housing is inserted into the injector tube and the seal member sealingly engaging the outer peripheral surface of the housing, adjacent portions of the injector tube and the glass to be repaired; and a seal member connected to the housing and disposed generally between the upper and the lower ends of the housing said seal member sealing engaging a portion of the housing and adjacent portions of the ijector tube when the housing is inserted in the tube opening in the injector tube;

an insert disposable generally over the break in the plate glass and bondable to the glass for closing any opening in the glass formed by the break; and a holder assembly removably connectable to the glass to be repaired and having a portion engagable with the glass insert for holding the glass insert in position against the glass to be repaired during the repair process.

19. The apparatus of claim 18 wherein the holder assembly is defined further to include:

a bar having opposite ends;

a first suction cup having one end connected to the bar generally near one end of the bar;

a second suction cup having one end connected to the bar generally near the end of the bar opposite the end having the first suction cup connected thereto, the first and the second suction cups each being adapted to suctioningly engage the glass for removably securing the holder assembly to the glass;

a rod having opposite ends and being disposed through a portion of the bar generally between the opposite ends of the bar; and a pad connected to one end of the rod for engaging the insert and cooperating to hold the insert in position against the glass during the repair of the plate glass.

20. An apparatus for repairing breaks in a glass utilizing a glass replacement chemical wherein the glass replacement chemical is in a dispenser having a dispensing end, the apparatus comprising:

a base having a forward end, a rearward end, an upper surface and a lower surface; and an injector tube having an outer peripheral surface, an upper end and a lower end, the injector tube being supported on the base with a portion of the injector tube extending a distance from the lower surface of the base and terminating with the lower end of the injector tube, a tube opening being formed in a portion of the injector tube intersecting the upper and the lower ends of the injector tube, an access opening being formed on a portion of the injector tube with the access opening intersecting the outer peripheral surface of the injector tube at a position generally between the upper and the lower ends of the injector tube and the access opening extending a distance through the injector tube and intersecting the tube opening;

a plunger having an upper end and a lower end, the plunger being removably insertable through the upper end of the injector tube and through the tube opening for forcing glass replacement chemical in the tube opening generally outwardly through the lower end of the injector tube; and a seal assembly comprising;

a housing having an upper end, a lower end, an outer peripheral surface and an opening extending therethrough intersecting the upper and the lower ends thereof, the housing being insertable into the tube opening through the lower end of the injector tube;

a seal member connected to the housing and disposed generally near the lower end of the housing, the seal member extending a distance from the lower end of the injector tube when the housing is inserted into the injector tube and the seal member sealingly engaging the outer perpheral surface of the housing, adjacent portions of the injector tube and the glass to be repaired; and a seal member connected to the housing generally near the upper end of the housing, the seal member sealingly engaging the housing and being sealing engagable with adjacent portions of the plunger.

21. The apparatus of claim 20 wherein a portion of the injector tube formed by the tube opening is threaded, and wherein a portion of the outer peripheral surface of the plunger is threaded, the threaded portion of the plunger being threadedly engagable with the threaded portion in the tube opening for threadedly moving the plunger through the tube opening to force the glass replacement chemical out of the tube opening.

* * * * *